UNITED STATES PATENT OFFICE.

FRANCIS ERNEST DUNNETT, OF LONDON, ENGLAND, ASSIGNOR TO HUMIDINE, LIMITED, OF LONDON, ENGLAND, A COMPANY OF GREAT BRITAIN AND IRELAND.

NON-CORROSIVE AND ANTIFOULING PAINT OR COMPOSITION.

No. 824,069.     Specification of Letters Patent.     Patented June 19, 1906.

Application filed October 23, 1905. Serial No. 284,032.

*To all whom it may concern:*

Be it known that I, FRANCIS ERNEST DUNNETT, engineer, of 7 King street, Cheapside, in the city of London, England, have invented a certain new and useful Improved Non-Corrosive and Antifouling Paint or Composition; and I do hereby declare that the following is a full, clear, and exact description of the same.

This invention relates to a new or improved non-corrosive and antifouling paint or composition for painting the hulls of seagoing ships, and has for its object the production of a paint or composition which effectually preserves the surface to which it is applied from erosion, foulness, and incrustation.

A paint or composition according to this invention comprises petrolatum, asphaltum, wood-tar, and a suitable coloring-matter or pigment, preferably of a poisonous character, such as paris-green. These various ingredients are mixed together in different proportions according to the particular use for which the paint or composition is intended, and I have found by experiment that when compounded as follows and in or about the proportions stated a paint or composition results which is found entirely satisfactory in actual use on the hulls of ships voyaging in tropical waters.

I take fifty (50) parts of a total eighty (80) parts of petrolatum and melt over a slow fire, adding thereto ten (10) parts of asphaltum, and boil together slowly. Seven (7) parts of wood-tar (Stockholm tar) is then added, together with the remaining thirty (30) parts of petrolatum. After further boiling together and when cooled sufficiently so as to prevent volatilization, three (3) parts of paris-green (arsenite of copper,) red lead, or other suitable coloring-matter or pigment, preferably of a poisonous character, is stirred into the mass, which may then be immediately applied to the surface to be coated, or stored for future use. The paint or composition is put on with brushes in the usual manner and may be applied hot, but at normal temperatures it is preferably applied cold.

The petrolatum I prefer to employ is the final residue obtained in the distillation of petroleum which is practically a solid grease at ordinary temperatures; but other varieties of petrolatum may in some cases be employed, but are not so satisfactory in practice as being somewhat too refined, and, further, are more costly than the final residuum, which is a waste product.

Other pigments or coloring-matters may be employed in place of the paris-green, but they should preferably be of a poisonous nature, such as London purple (arsenite of iron) or other arsenical or mercurial compounds.

I do not limit myself to the proportions of the various ingredients above stated, as they may be varied considerably so long as the finished paint or composition contains a preponderant proportion of petrolatum or the proportion of added materials to the petrolatum is such as not to prejudicially affect the non-desiccant properties of the petrolatum.

What I claim, and desire to secure by Letters Patent of the United States, is—

1. A non-corrosive and antifouling paint or composition comprising petrolatum, asphaltum, wood-tar, and a coloring-matter.

2. The herein-described non-corrosive and antifouling paint or composition consisting of petrolatum eighty parts, asphaltum ten parts, wood-tar seven parts, and a poisonous pigment or coloring-matter three parts.

3. The process herein described for producing a non-corrosive and antifouling paint from petrolatum which consists in melting petrolatum and adding thereto asphaltum and Stockholm tar, boiling these ingredients together and when sufficiently cold so as to prevent volatilization, adding poisonous coloring-matter substantially as described.

FRANCIS ERNEST DUNNETT.

Witnesses:
GEORGE ISAAC BRIDGES,
A. MILLWARD HACK